(12) United States Patent
Tabuteau

(10) Patent No.: US 12,544,383 B1
(45) Date of Patent: Feb. 10, 2026

(54) METHODS OF TREATING MIGRAINES WITH A COMBINATION OF A MELOXICAM AND A RIZATRIPTAN

(71) Applicant: AXSOME THERAPEUTICS, INC., New York, NY (US)

(72) Inventor: Herriot Tabuteau, New York, NY (US)

(73) Assignee: AXSOME THERAPEUTICS, INC., New York, NY (US)

( * ) Notice: Subject to any disclaimer, the term of this patent is extended or adjusted under 35 U.S.C. 154(b) by 0 days.

(21) Appl. No.: 19/075,007

(22) Filed: Mar. 10, 2025

Related U.S. Application Data

(60) Provisional application No. 63/751,707, filed on Jan. 30, 2025, provisional application No. 63/751,735, filed on Jan. 30, 2025.

(51) Int. Cl.
| | |
|---|---|
| *A61K 31/5415* | (2006.01) |
| *A61K 9/20* | (2006.01) |
| *A61K 31/4196* | (2006.01) |
| *A61P 9/04* | (2006.01) |
| *A61P 25/06* | (2006.01) |

(52) U.S. Cl.
CPC ........ *A61K 31/5415* (2013.01); *A61K 9/2009* (2013.01); *A61K 9/2027* (2013.01); *A61K 9/205* (2013.01); *A61K 31/4196* (2013.01); *A61P 9/04* (2018.01); *A61P 25/06* (2018.01)

(58) Field of Classification Search
CPC ..... A61K 31/54; A61K 31/4196; A61P 25/06; A61P 9/04
See application file for complete search history.

(56) References Cited

U.S. PATENT DOCUMENTS

| | | | |
|---|---|---|---|
| 4,233,299 A | 11/1980 | Trummlitz et al. | |
| 5,872,145 A | 2/1999 | Plachetka | |
| 6,060,499 A | 5/2000 | Plachetka | |
| 6,077,539 A | 6/2000 | Plachetka et al. | |
| 6,284,269 B1 | 9/2001 | Struengmann et al. | |
| 6,384,034 B2 | 5/2002 | Simitchieva et al. | |
| 6,479,551 B1 | 11/2002 | Plachetka et al. | |
| 6,495,535 B1 | 12/2002 | Plachetka et al. | |
| 6,586,458 B1 | 7/2003 | Plachetka | |
| 6,926,907 B2 | 8/2005 | Plachetka | |
| 7,030,162 B2 | 4/2006 | Plachetka et al. | |
| 7,060,694 B2 | 6/2006 | Plachetka et al. | |
| 7,332,183 B2 | 2/2008 | Plachetka et al. | |
| 8,022,095 B2 | 9/2011 | Plachetka | |
| 8,206,741 B2 | 6/2012 | Plachetka | |
| 8,512,727 B2 | 8/2013 | Cooper | |
| 8,557,285 B2 | 10/2013 | Plachetka | |
| 8,835,407 B2 | 9/2014 | Mosher et al. | |
| 8,852,636 B2 | 10/2014 | Plachetka | |
| 8,858,996 B2 | 10/2014 | Plachetka | |
| 8,865,190 B2 | 10/2014 | Plachetka | |
| 8,945,621 B2 | 2/2015 | Ault et al. | |
| 9,161,920 B2 | 10/2015 | Plachetka | |
| 9,198,888 B2 | 12/2015 | Plachetka | |
| 9,220,698 B2 | 12/2015 | Ault et al. | |
| 9,265,732 B2 | 2/2016 | Plachetka et al. | |
| 9,345,695 B2 | 5/2016 | Plachetka | |
| 9,364,439 B2 | 6/2016 | Plachetka | |
| 9,393,208 B2 | 7/2016 | Ault et al. | |
| 9,539,214 B2 | 1/2017 | Plachetka | |
| 9,707,181 B2 | 7/2017 | Plachetka | |
| 9,801,824 B2 | 10/2017 | Ault et al. | |
| 9,801,827 B2 | 10/2017 | Plachetka et al. | |
| 9,821,075 B2 | 11/2017 | Tabuteau | |
| 10,029,010 B1 | 7/2018 | Tabuteau | |
| 10,058,614 B2 | 8/2018 | Tabuteau | |
| 10,137,131 B2 | 11/2018 | Tabuteau | |
| 10,195,278 B2 | 2/2019 | Tabuteau | |
| 10,195,279 B2 | 2/2019 | Tabuteau | |

(Continued)

FOREIGN PATENT DOCUMENTS

| | | |
|---|---|---|
| AU | 2018205790 B2 | 7/2018 |
| CA | 2565941 A1 | 11/2005 |

(Continued)

OTHER PUBLICATIONS

Al-Naher et al.; "Renal function monitoring in heart failure—what is the optimal frequency? A narrative review"; 2018; Br. J. Clin. Pharmacol.; 84: 5-17; DOI:10.1111/bcp.13434 (Year: 2018).*
Adelborg et al.; "Migraine and risk of cardiovascular diseases: Danish population based matched cohort study"; 2018; BMJ; 360:k96; http://dx.doi.org/10.1136/bmj.k96 (Year: 2018).*
Furst et al., Dose response and safety study of meloxicam up to 22.5 mg daily in rheumatoid arthritis: a 12 week multicenter, double blind, dose response study versus placebo and diclofenac, The Journal of rheumatology, 29(3), 436-446, Mar. 2002.
International Preliminary Report on Patentability, PCT/US2021/065552, mailed Jul. 13, 2023.
International Search Report and Written Opinion, PCT/US2023/067172 mailed Jul. 28, 2023.
Jones, A. et al. "Treatment of Migraine Pain and Associated Symptoms with AXS-07: Results from MOVEMENT, a Long-term Efficacy and Safety Study" American Headache Society Virtual Annual Scientific Meeting Jun. 3-6, 2021, p. 162. [retrieved from internet on Jul. 24, 2023] <https://www.axsome.com/publications/AHS_2021_MOVEMENT_poster_4_30_21_FINAL.pdf>.

(Continued)

*Primary Examiner* — Timothy P Thomas
(74) *Attorney, Agent, or Firm* — PROCOPIO, CORY, HARGREAVES & SAVITCH LLP; Brent Johnson; Yuefen Zhou

(57) ABSTRACT

Disclosed herein are compositions comprising an NSAID such as meloxicam and/or rizatriptan in combination with a cyclodextrin and/or a bicarbonate. These compositions may be orally administered, for example, to improve the bioavailability or pharmacokinetics of meloxicam and/or rizatriptan for the treatment of pain such as migraine, arthritis, and other conditions. Also disclosed herein are methods of treating pain, such as migraine, comprising administering meloxicam and rizatriptan to a human being suffering from pain, such as migraine. For migraine, these methods may be particularly useful when the meloxicam and rizatriptan are administered while the human being is suffering from an acute attack of migraine pain or migraine aura.

24 Claims, No Drawings

(56) References Cited

U.S. PATENT DOCUMENTS

| | | |
|---|---|---|
| 10,265,324 B2 | 4/2019 | Tabuteau |
| 10,265,399 B2 | 4/2019 | Tabuteau |
| 10,265,400 B2 | 4/2019 | Tabuteau |
| 10,307,484 B2 | 6/2019 | Tabuteau |
| 10,322,181 B2 | 6/2019 | Tabuteau |
| 10,363,312 B2 | 7/2019 | Tabuteau |
| 10,369,224 B2 | 8/2019 | Tabuteau |
| 10,369,225 B2 | 8/2019 | Tabuteau |
| 10,426,839 B2 | 10/2019 | Tabuteau |
| 10,456,471 B2 | 10/2019 | Tabuteau |
| 10,463,736 B2 | 11/2019 | Tabuteau |
| 10,471,014 B2 | 11/2019 | Tabuteau |
| 10,471,068 B2 | 11/2019 | Tabuteau |
| 10,471,069 B2 | 11/2019 | Tabuteau |
| 10,485,871 B2 | 11/2019 | Tabuteau |
| 10,512,692 B2 | 12/2019 | Tabuteau |
| 10,512,693 B2 | 12/2019 | Tabuteau |
| 10,517,950 B1 | 12/2019 | Tabuteau |
| 10,532,101 B1 | 1/2020 | Tabuteau |
| 10,537,642 B1 | 1/2020 | Tabuteau |
| 10,561,664 B1 | 2/2020 | Tabuteau |
| 10,583,088 B2 | 3/2020 | Tabuteau |
| 10,583,144 B2 | 3/2020 | Tabuteau |
| 10,653,777 B2 | 5/2020 | Tabuteau |
| 10,688,102 B2 | 6/2020 | Tabuteau |
| 10,688,185 B2 | 6/2020 | Tabuteau |
| 10,695,429 B2 | 6/2020 | Tabuteau |
| 10,695,430 B2 | 6/2020 | Tabuteau |
| 10,702,535 B2 | 7/2020 | Tabuteau |
| 10,702,602 B2 | 7/2020 | Tabuteau |
| 10,722,583 B2 | 7/2020 | Tabuteau |
| 10,729,696 B2 | 8/2020 | Tabuteau |
| 10,729,697 B2 | 8/2020 | Tabuteau |
| 10,729,773 B2 | 8/2020 | Tabuteau |
| 10,729,774 B1 | 8/2020 | Tabuteau |
| 10,758,617 B2 | 9/2020 | Tabuteau |
| 10,758,618 B2 | 9/2020 | Tabuteau |
| 10,780,165 B2 | 9/2020 | Tabuteau |
| 10,780,166 B2 | 9/2020 | Tabuteau |
| 10,799,588 B2 | 10/2020 | Tabuteau |
| 10,821,181 B2 | 11/2020 | Tabuteau |
| 10,821,182 B2 | 11/2020 | Tabuteau |
| 10,894,053 B2 | 1/2021 | Tabuteau |
| 10,905,693 B2 | 2/2021 | Tabuteau |
| 10,918,722 B2 | 2/2021 | Tabuteau |
| 10,933,136 B2 | 3/2021 | Tabuteau |
| 10,933,137 B2 | 3/2021 | Tabuteau |
| 10,940,153 B2 | 3/2021 | Tabuteau |
| 10,987,358 B2 | 4/2021 | Tabuteau |
| 11,013,805 B2 | 5/2021 | Tabuteau |
| 11,013,806 B2 | 5/2021 | Tabuteau |
| 11,020,483 B2 | 6/2021 | Tabuteau |
| 11,045,549 B2 | 6/2021 | Tabuteau |
| 11,077,117 B2 | 8/2021 | Tabuteau |
| 11,110,173 B2 | 9/2021 | Tabuteau |
| 11,123,431 B2 | 9/2021 | Tabuteau |
| 11,129,895 B2 | 9/2021 | Tabuteau |
| 11,135,295 B2 | 10/2021 | Tabuteau |
| 11,185,550 B2 | 11/2021 | Tabuteau |
| 11,207,327 B2 | 12/2021 | Tabuteau |
| 11,207,328 B2 | 12/2021 | Tabuteau |
| 11,219,626 B2 | 1/2022 | Tabuteau |
| 11,266,657 B2 | 3/2022 | Tabuteau |
| 11,285,213 B2 | 3/2022 | Tabuteau |
| 11,285,214 B2 | 3/2022 | Tabuteau |
| 11,285,215 B2 | 3/2022 | Tabuteau |
| 11,331,323 B2 | 5/2022 | Tabuteau |
| 11,357,854 B2 | 6/2022 | Tabuteau |
| 11,369,684 B2 | 6/2022 | Tabuteau |
| 11,426,414 B2 | 8/2022 | Tabuteau |
| 11,433,078 B2 | 9/2022 | Tabuteau |
| 11,433,079 B2 | 9/2022 | Tabuteau |
| 11,471,464 B2 | 10/2022 | Tabuteau |
| 11,471,465 B2 | 10/2022 | Tabuteau |
| 11,504,429 B2 | 11/2022 | Tabuteau |
| 11,510,927 B2 | 11/2022 | Tabuteau |
| 11,571,428 B2 | 2/2023 | Tabuteau |
| 11,602,563 B2 | 3/2023 | Tabuteau |
| 11,607,456 B2 | 3/2023 | Tabuteau |
| 11,617,755 B2 | 4/2023 | Tabuteau |
| 11,617,756 B2 | 4/2023 | Tabuteau |
| 11,617,791 B2 | 4/2023 | Tabuteau |
| 11,628,173 B2 | 4/2023 | Tabuteau |
| 11,712,441 B2 | 8/2023 | Tabuteau |
| 11,738,085 B2 | 8/2023 | Tabuteau |
| 11,759,522 B2 | 9/2023 | Tabuteau |
| 11,801,250 B2 | 10/2023 | Tabuteau |
| 11,806,354 B2 | 11/2023 | Tabuteau |
| 11,826,354 B2 | 11/2023 | Tabuteau |
| 11,826,370 B2 | 11/2023 | Tabuteau |
| 11,865,117 B2 | 1/2024 | Tabuteau |
| 11,944,683 B2 | 4/2024 | Tabuteau |
| 11,998,552 B2 | 6/2024 | Tabuteau |
| 12,005,118 B2 | 6/2024 | Tabuteau |
| 12,128,052 B2 | 10/2024 | Tabuteau |
| 12,156,914 B2 | 12/2024 | Tabuteau |
| 12,246,023 B2 | 3/2025 | Tabuteau |
| 12,268,693 B2 | 4/2025 | Tabuteau |
| 12,357,640 B2 | 7/2025 | Tabuteau |
| 12,370,196 B2 | 7/2025 | Tabuteau |
| 2002/0016348 A1 | 2/2002 | Simitchieva et al. |
| 2002/0035107 A1 | 3/2002 | Henke et al. |
| 2003/0008003 A1 | 1/2003 | Jamali |
| 2004/0214861 A1 | 10/2004 | Seibert |
| 2004/0229038 A1 | 11/2004 | Cooper et al. |
| 2005/0249806 A1 | 11/2005 | Proehl et al. |
| 2007/0154542 A1 | 7/2007 | Tananbaum et al. |
| 2007/0281927 A1 | 12/2007 | Tyavanagimatt et al. |
| 2009/0068262 A1 | 3/2009 | Zalit et al. |
| 2009/0203680 A1 | 8/2009 | Hanna et al. |
| 2009/0311335 A1 | 12/2009 | Jenkins et al. |
| 2010/0226943 A1 | 9/2010 | Brennan et al. |
| 2013/0266658 A1 | 10/2013 | Weißet al. |
| 2014/0248353 A1 | 9/2014 | Ryoo et al. |
| 2016/0228576 A1 | 8/2016 | Tabuteau |
| 2018/0050106 A1 | 2/2018 | Tabuteau |
| 2018/0127490 A1 | 5/2018 | Bigal et al. |
| 2018/0207274 A1 | 7/2018 | Tabuteau |
| 2018/0214380 A1 | 8/2018 | Tabuteau |
| 2018/0256593 A1 | 9/2018 | Tabuteau |
| 2018/0264114 A1 | 9/2018 | Tabuteau |
| 2018/0264115 A1 | 9/2018 | Tabuteau |
| 2018/0271981 A1 | 9/2018 | Tabuteau |
| 2018/0280306 A1 | 10/2018 | Tabuteau |
| 2018/0280308 A1 | 10/2018 | Tabuteau |
| 2018/0280512 A1 | 10/2018 | Tabuteau |
| 2018/0289806 A1 | 10/2018 | Tabuteau |
| 2018/0289807 A1 | 10/2018 | Tabuteau |
| 2018/0289808 A1 | 10/2018 | Tabuteau |
| 2019/0000975 A1 | 1/2019 | Tabuteau |
| 2019/0070192 A1 | 3/2019 | Tabuteau |
| 2019/0142942 A1 | 5/2019 | Tabuteau |
| 2019/0142943 A1 | 5/2019 | Tabuteau |
| 2019/0224320 A1 | 7/2019 | Tabuteau |
| 2019/0224321 A1 | 7/2019 | Tabuteau |
| 2019/0231792 A1 | 8/2019 | Tabuteau |
| 2019/0255177 A1 | 8/2019 | Tabuteau |
| 2019/0307884 A1 | 10/2019 | Tabuteau |
| 2019/0314504 A1 | 10/2019 | Tabuteau |
| 2019/0336510 A1 | 11/2019 | Tabuteau |
| 2020/0000819 A1 | 1/2020 | Tabuteau |
| 2020/0000820 A1 | 1/2020 | Tabuteau |
| 2020/0000919 A1 | 1/2020 | Tabuteau |
| 2020/0000920 A1 | 1/2020 | Tabuteau |
| 2020/0000921 A1 | 1/2020 | Tabuteau |
| 2020/0000922 A1 | 1/2020 | Tabuteau |
| 2020/0009250 A1 | 1/2020 | Tabuteau |
| 2020/0030338 A1 | 1/2020 | Tabuteau |
| 2020/0038408 A1 | 2/2020 | Tabuteau |
| 2020/0085951 A1 | 3/2020 | Tabuteau |
| 2020/0085952 A1 | 3/2020 | Tabuteau |
| 2020/0085953 A1 | 3/2020 | Tabuteau |
| 2020/0085954 A1 | 3/2020 | Tabuteau |
| 2020/0085955 A1 | 3/2020 | Tabuteau |

(56) References Cited

U.S. PATENT DOCUMENTS

| | | |
|---|---|---|
| 2020/0155565 A1 | 5/2020 | Tabuteau |
| 2020/0179396 A1 | 6/2020 | Tabuteau |
| 2020/0222539 A1 | 7/2020 | Tabuteau |
| 2020/0230239 A1 | 7/2020 | Tabuteau |
| 2020/0230240 A1 | 7/2020 | Tabuteau |
| 2020/0230241 A1 | 7/2020 | Tabuteau |
| 2020/0246461 A1 | 8/2020 | Tabuteau |
| 2020/0246462 A1 | 8/2020 | Tabuteau |
| 2020/0254097 A1 | 8/2020 | Tabuteau |
| 2020/0261466 A1 | 8/2020 | Tabuteau |
| 2020/0261467 A1 | 8/2020 | Tabuteau |
| 2020/0276311 A1 | 9/2020 | Tabuteau |
| 2020/0289524 A1 | 9/2020 | Tabuteau |
| 2020/0330476 A1 | 10/2020 | Tabuteau |
| 2020/0338198 A1 | 10/2020 | Tabuteau |
| 2020/0376124 A1 | 12/2020 | Tabuteau |
| 2020/0376125 A1 | 12/2020 | Tabuteau |
| 2020/0405861 A1 | 12/2020 | Tabuteau |
| 2020/0405862 A1 | 12/2020 | Tabuteau |
| 2021/0000956 A1 | 1/2021 | Tabuteau |
| 2021/0008211 A1 | 1/2021 | Tabuteau |
| 2021/0030876 A1 | 2/2021 | Tabuteau |
| 2021/0121474 A1 | 4/2021 | Tabuteau |
| 2021/0128575 A1 | 5/2021 | Tabuteau |
| 2021/0128576 A1 | 5/2021 | Tabuteau |
| 2021/0154299 A1 | 5/2021 | Tabuteau |
| 2021/0177971 A1 | 6/2021 | Tabuteau |
| 2021/0177972 A1 | 6/2021 | Tabuteau |
| 2021/0196726 A1 | 7/2021 | Tabuteau |
| 2021/0228592 A1 | 7/2021 | Tabuteau |
| 2021/0260193 A1 | 8/2021 | Tabuteau |
| 2021/0260194 A1 | 8/2021 | Tabuteau |
| 2021/0275670 A1 | 9/2021 | Tabuteau |
| 2021/0322552 A1 | 10/2021 | Tabuteau |
| 2021/0346393 A1 | 11/2021 | Tabuteau |
| 2021/0353636 A1 | 11/2021 | Tabuteau |
| 2021/0361667 A1 | 11/2021 | Tabuteau |
| 2021/0369729 A1 | 12/2021 | Tabuteau |
| 2021/0369845 A1 | 12/2021 | Tabuteau |
| 2021/0393782 A1 | 12/2021 | Tabuteau |
| 2021/0401988 A1 | 12/2021 | Tabuteau |
| 2022/0008539 A1 | 1/2022 | Tabuteau |
| 2022/0054498 A1 | 2/2022 | Tabuteau |
| 2022/0088027 A1 | 3/2022 | Tabuteau |
| 2022/0096490 A1 | 3/2022 | Tabuteau |
| 2022/0105104 A1 | 4/2022 | Tabuteau |
| 2022/0175792 A1 | 6/2022 | Tabuteau |
| 2022/0175927 A1 | 6/2022 | Tabuteau |
| 2022/0211851 A1 | 7/2022 | Tabuteau |
| 2022/0218718 A1 | 7/2022 | Tabuteau |
| 2022/0233698 A1 | 7/2022 | Tabuteau |
| 2022/0241292 A1 | 8/2022 | Tabuteau |
| 2022/0313824 A1 | 10/2022 | Tabuteau |
| 2022/0331428 A1 | 10/2022 | Tabuteau |
| 2023/0000879 A1 | 1/2023 | Tabuteau |
| 2023/0000880 A1 | 1/2023 | Tabuteau |
| 2023/0016504 A1 | 1/2023 | Tabuteau |
| 2023/0025944 A1 | 1/2023 | Tabuteau |
| 2023/0042938 A1 | 2/2023 | Tabuteau |
| 2023/0097899 A1 | 3/2023 | Tabuteau |
| 2023/0108797 A1 | 4/2023 | Tabuteau |
| 2023/0131057 A1 | 4/2023 | Tabuteau |
| 2023/0173072 A1 | 6/2023 | Tabuteau |
| 2023/0218762 A1 | 7/2023 | Tabuteau |
| 2023/0233574 A1 | 7/2023 | Tabuteau |
| 2023/0285306 A1 | 9/2023 | Tabuteau |
| 2023/0338390 A1 | 10/2023 | Tabuteau |
| 2023/0355637 A1 | 11/2023 | Tabuteau |
| 2023/0372355 A1 | 11/2023 | Tabuteau |
| 2024/0058354 A1 | 2/2024 | Tabuteau |
| 2024/0066036 A1 | 2/2024 | Tabuteau |
| 2024/0082254 A1 | 3/2024 | Tabuteau |
| 2024/0100060 A1 | 3/2024 | Tabuteau |
| 2024/0245776 A1 | 7/2024 | Tabuteau |
| 2024/0261407 A1 | 8/2024 | Tabuteau |
| 2024/0293342 A1 | 9/2024 | Tabuteau |
| 2024/0307408 A1 | 9/2024 | Tabuteau |
| 2025/0009754 A1 | 1/2025 | Tabuteau |
| 2025/0177535 A1 | 6/2025 | Tabuteau |
| 2025/0205246 A1 | 6/2025 | Tabuteau |
| 2025/0255880 A1 | 8/2025 | Tabuteau |
| 2025/0268908 A1 | 8/2025 | Tabuteau |

FOREIGN PATENT DOCUMENTS

| | | | |
|---|---|---|---|
| CN | 101984960 A | 3/2011 | |
| CN | 101987081 | 3/2011 | |
| CN | 102526058 A | 7/2012 | |
| WO | 1998006392 A1 | 2/1998 | |
| WO | 1999009988 A1 | 3/1999 | |
| WO | 2000035448 | 6/2000 | |
| WO | 2000059475 | 10/2000 | |
| WO | 2005021041 A1 | 3/2005 | |
| WO | 2005076987 | 8/2005 | |
| WO | 2005105102 A1 | 11/2005 | |
| WO | 2008006216 | 1/2008 | |
| WO | 2009152192 A1 | 12/2009 | |
| WO | 2012072570 | 6/2012 | |
| WO | 2014161131 A1 | 10/2014 | |
| WO | 2016131067 | 8/2016 | |
| WO | 2017042607 | 3/2017 | |
| WO | 2018129220 A1 | 7/2018 | |
| WO | 2018209150 A1 | 11/2018 | |
| WO | 202010196 A1 | 1/2020 | |
| WO | WO-2021207253 A1 * | 10/2021 | ......... A61K 31/5415 |
| WO | 2022147155 A1 | 7/2022 | |

OTHER PUBLICATIONS

Thomas, Z. et al. "Identifying areas of unmet need among migraineurs with inadequate response to acute therapies: Results from the MOMENTUM trial" Headache (May 20, 2022) vol. 62, Issue S1, Special Issue: American Headache Society 64th Annual Scientific Meeting Jun. 9-12, 2022 Denver, Colorado, p. 69, p. 77.

Jones, A. et al. "Efficacy of AXS-07 (MoSEIC™ meloxicam and rizatriptan) in patients with risk factors for inadequate response to acute migraine medications" Headache (May 20, 2022) vol. 62, Issue S1, Special Issue: American Headache Society 64th Annual Scientific Meeting Jun. 9-12, 2022, Denver, Colorado, pp. 142-143, p. 166.

Lipton et al., "Ineffective acute treatment of episodic migraine is associated with new-onset chronic migraine," Neurology, 84(7), 688-695, Feb. 2015.

International Search Report and Written Opinion, PCT/US2024/044700 mailed Sep. 27, 2024.

Tepper et al., "Efficacy of AXS-07 (MOSEIC™ Meloxicam and Rizatriptan) in Patients with Risk Factors for Inadequate Response to Acute Migraine Medications (P13-12.001)." Neurology, Apr. 25, 2023, vol. 100, No. 17, supplement 2.

International Preliminary Report on Patentability, PCT/US2023/067172, mailed Nov. 28, 2024.

Hu et al., Predicting Biological Functions of Compounds Based on Chemical-Chemical Interactions, PLoS One, 6(12), Dec. 2011, 9 pgs.

Johnell et al., Concomitant Use of Gastroprotective Drugs Among Elderly NSAID/COX-2 Selective Inhibitor Users: a Nationwide Register-Based Study, Clinical Drug Investigation, 28(11), 687-695, Nov. 2008.

Leonard et al., Proton Pump Inhibitors and Traditional Nonsteroidal Anti-Inflammatory Drugs and the Risk of Acute Interstitial Nephritis and Acute Kidney Injury, Pharmacoepidemiology and Drug Safety, 21(11), 1155-1172, Nov. 2012.

Vonkeman et al., Proton-Pump Inhibitors are Associated with a Reduced Risk for Bleeding and Perforated Gastroduodenal Ulcers Attributable to Non-Steroidal Anti-Inflammatory Drugs: a Nested Case-Control Study, Arthritis Research & Therapy, 9(3), May 2007, 8 pgs.

Yilmaz et al., Does Adding Misoprostol to Standard Intravenous Proton Pump Inhibitor Protocol Improve the Outcome of Aspirin/

(56) References Cited

OTHER PUBLICATIONS

NSAID-Induced Upper Gastrointestinal Bleeding?, Digestive Diseases and Sciences, 52(1), 110-118, Jan. 2007.
International search report dated Aug. 11, 2016, corresponding to international patent application No. PCT/US2016/026991.
Written opinion of the international searching authority dated Aug. 11, 2016, corresponding to international patent application No. PCT/US2016/026991.
Stella et al., Toxicologic Pathology, 2008, 36:30-42.
Jain et al., AAAPS PharmSciTech, 2011, 12(4):1163-1175.
Baboota et al., Journal of Inclusion Phenomena and Macrocyclic Chemistry, 2005, 51:219-224.
Hosie et al., British Journal of Rheumatology, 35 (suppl. 1), 39-43, 1996.
Wojtulewski et al., British Journal of Rheumatology; 35 (suppl. 1), 22-28, 1996.
Goldstein et al., Intragastric Acid Control in Non-Steroidal Anti-inflammatory Drug Users: Comparison of Esomeprazole, Lansoprazole and Pantoprazole, Alimentary Pharmacology & Therapeutics 23, 1189-1196, 2006.
Euller-Ziegler et al. Meloxicam: a review of its pharmacokinetics, efficacy and tolerability following intramuscular administration, Inflamm. res. 50, Supplement 1, S5-S9, 2001.
Iroko Pharmaceuticals, Vivlodex Label, Oct. 2015.
Mayo Clinic, http://web.archive.org/web/20141113013539/https://www.mayoclinic.org/drugs-supplements /meloxicam-oral-route/proper-use/drg-20066928 (bearing an alleged date of 2014) (retrieved from the internet Mar. 3, 2019) (2014).
Láinez, "Rizatriptan in the treatment of migraine." Neuropsychiatric disease and treatment, 2(3), p. 247, Sep. 2006.
Landy S, Rice K, Lobo B. Central sensitisation and cutaneous allodynia in migraine. CNS drugs, 18(6), 337-42, May 2004.
Weatherall, "Drug therapy in headache," Clin. Med. (Lond.), 15(3), 273-279, Jun. 2015. (PMID: 26031979, Year 2015).
Cameron C, et al., Triptans in the Acute Treatment of Migraine: a Systematic Review and Network Meta-Analysis, DOI: 10.1111/head.12601, https://www.ncbi.nlm.nih.gov/pubmed/26178694, accessed on Mar. 25, 2020.
Ng-Mak DS, et al., Acute migraine treatment with oral triptans and NSAIDs in a managed care population, DOI: 10.1111/j.1526-4610.2007.01055.x, https://www.ncbi.nlm.nih.gov/pubmed/18819177, accessed on Mar. 25, 2020.
Lipton RB, et al., Impact of NSAID and Triptan use on developing chronic migraine: results from the American Migraine Prevalence and Prevention (AMPP) study, DOI: 10.1111/head.12201, https://www.ncbi.nim.nih.gov/pubmed/23992516, accessed on Mar. 25, 2020.
Robert T., Migraine Management Essential 6: Rescue treatment; bearing an alleged date of Apr. 2011, https://migraine.com/blog/migraine-management-rescue-treatment/, accessed on Apr. 15, 2020.
American Headache Society, Home/News /MAST Study Identifies Most Bothersome Symptom (MBS) for Patients with Migraine, https://americanheadachesociety.org/news/mast-most-bothersome-symptom/, accessed on May 7, 2020.
Munjal et al., Most Bothersome Symptom in Persons With Migraine: Results From the Migraine in America Symptoms and Treatment (MAST) Study, The Journal of Head and Face Pain, https://headachejournal.onlinelibrary.wiley.com/doi/10.1111/head.13708, accessed on May 7, 2020.
International Search Report and Written Opinion, PCT/US2019/040495, mailed Oct. 31, 2019.
Deshpande et al., Bi-layer tablets—an emerging trend: a review, International journal of pharmaceutical sciences and research, 2(10): 2534-2544, Oct. 1, 2011.
International Search Report, PCT/US2020/017046, mailed Jun. 4, 2020.
Written Opinion of the International Searching Authority, PCT/US2020/017046, mailed Jun. 4, 2020.
International Preliminary Report on Patentability, PCT/US2019/040495, mailed Jan. 14, 2021.
Lionetto et al., Emerging treatment for chronic migraine and refractory chronic migraine. Expert Opin Emerg Drugs, 17 (3): 393-406, Sep. 2012.
International Search Report and Written Opinion of the International Searching Authority, PCT/US2021/026027, mailed Jun. 4, 2021.
International Search Report and Written Opinion of the International Searching Authority, PCT/US2019/053167, mailed Jan. 9, 2020.
International Preliminary Report on Patentability, PCT/US2020/017046, mailed Aug. 19, 2021.
Pardutz et al., "NSAIDs in the Acute Treatment of Migraine: a Review of Clinical and Experimental Data", Pharmaceuticals, 3 (6), 1966-1987, Jun. 2010.
Dalal et al., Meloxicam and Risk of Myocardial Infarction: a Population-based Nested Case-control Study, Rheumatol Int., 37(12), 2071-2078, Dec. 2017.
Highlights of Prescribing Information for Mobic® (meloxicam) tablets, oral suspension (Initial U.S. Approval: 2000).
Oregon State University, New Drug Review: Treximet® (Sumatriptan-Naproxen).
Yuan et al., Intravenous ibuprofen for acute treatment of migraine: a double-blind, randomized, placebo-controlled pilot study, Headache: The Journal of Head and Face Pain, 61(9), 1432-1440, Oct. 2021.
Edwards et al., Evaluation of sumatriptan-naproxen in the treatment of acute migraine: a placebo-controlled, double-blind, cross-over study assessing cognitive function, Headache: The Journal of Head and Face Pain, 53(4), 656-664, Apr. 2013.
Khoury et al., Sumatriptan-naproxen fixed combination for acute treatment of migraine: a critical appraisal, Drug Design, Development and Therapy, 4, 9-17, 2010.
Buse et al., Comorbid and co-occurring conditions in migraine and associated risk of increasing headache pain intensity and headache frequency: results of the migraine in America symptoms and treatment (MAST) study, The Journal of Headache and Pain, 21(1), 1-16, Dec. 2020.
Singh et al., Risk of serious upper gastrointestinal and cardiovascular thromboembolic complications with meloxicam, Am J Med., 117(2), 100-106, Jul. 2004.
Syed, Y.Y., Sumatriptan/Naproxen Sodium: a Review in Migraine, Drugs, 76(1), 111-121, Jan. 2016.
Visser et al., Rizatriptan vs sumatriptan in the acute treatment of migraine. A placebo-controlled, dose-ranging study. Dutch/US Rizatriptan Study Group, Arch Neurol., 53(11), 1132-1137, Nov. 1996.
Highlights of Prescribing Information for VIVLODEX™, Medication Guide for VIVLODEX (meloxicam) capsules, for oral use (Initial U.S. Approval: 2000), issued or revised: Oct. 2015.
Ekusheva et al., The actual approaches to therapy of refractory migraine. Medical Journal of the Russian Federation, 20(5):45-52, Oct. 2014. (with English Abstract).
Pomeroy et al., Ketamine Infusions for Treatment Refractory Headache, Headache: The Journal of Head and Face Pain, 57(2), 276-282, Feb. 2017.
Ferrari et al., Oral triptans (serotonin 5-HT1B/1D agonists) in acute migraine treatment: a meta-analysis of 53 trials, The Lancet, 358, 1668-1675, Nov. 2001.
International Preliminary Report on Patentability, PCT/US2021/026027, mailed Oct. 20, 2022.
International Search Report and Written Opinion for PCT/US25/23660 mailed on Jun. 27, 2025.
Meglio, M. "EMERGE Study Aims to Highlight Therapeutic Benefit of AXS-07 After CGRPs Fail." Neurology Live, vol. 6 No. 1, p. 18, 2023.
Mannix, "A Review of the 5-HT1B/1D Agonist Rizatriptan: Update on Recent Research and Implications for the Future", Expert Opinion on Pharmacotherapy, 9(6): 1001-1011, Apr. 2008.
Straube et al., "Combined Analgesics in (Headache) Pain Therapy: Shotgun Approach or Precise Multi-Target Therapeutics?", BMC Neurology, 11:43, 2011.

\* cited by examiner

METHODS OF TREATING MIGRAINES WITH A COMBINATION OF A MELOXICAM AND A RIZATRIPTAN

CROSS-REFERENCE TO RELATED APPLICATIONS

This application claims benefit of U.S. Provisional Pat. App. Nos. 63/751,707, filed Jan. 30, 2025; and 63/751,735, filed Jan. 30, 2025, which are incorporated by reference in their entirety.

SUMMARY

Some embodiments include a method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient, wherein the human patient is not experiencing hemiplegic migraine.

Some embodiments include a method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient for acute treatment of migraine, wherein the human patient is not experiencing hemiplegic migraine.

Some embodiments include a method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient, for acute treatment of migraine, wherein the human patient is not experiencing basilar migraine.

Some embodiments include a method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient, wherein the human patient is not experiencing basilar migraine.

Some embodiments include a method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient, wherein the human patient is not experiencing cluster headache.

Some embodiments include a method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient for acute treatment of migraine, wherein the human patient is not experiencing cluster headache. Some embodiments include a method of treating migraine, comprising: administering a tablet containing 20 mg of meloxicam, or a molar equivalent amount of a salt of meloxicam, and 10 mg of rizatriptan, or a molar equivalent amount of a salt of rizatriptan, to a human patient with a clear diagnosis of migraine, wherein if the human patient has no response after the tablet is administered, the diagnosis of migraine is reconsidered, and if the clear diagnosis of migraine is confirmed, the tablet is administered during a subsequent migraine.

Some embodiments include a method of treating migraine, comprising: administering a tablet containing 20 mg of meloxicam, or a molar equivalent amount of a salt of meloxicam, and 10 mg of rizatriptan, or a molar equivalent amount of a salt of rizatriptan, to a human patient with a clear diagnosis of migraine, reconsidering the diagnosis of migraine if the human patient has no response after the tablet is administered, and if reconsidering the diagnosis of migraine results in the clear diagnosis of migraine being confirmed, administering the tablet during a subsequent migraine.

Some embodiments include a method comprising selecting a human patient who has a negative cardiovascular evaluation, administering a first dose of a tablet in a medically-supervised setting, and performing an electrocardiogram (ECG) on the human patient immediately following administration the tablet, wherein the tablet contains 20 mg of meloxicam, or a molar equivalent amount of a salt of meloxicam, and 10 mg of rizatriptan, or a molar equivalent amount of a salt of rizatriptan.

Some embodiments include a method comprising selecting a human patient who has a negative cardiovascular evaluation, administering a first dose of a tablet in a medically-supervised setting, and performing an electrocardiogram (ECG) on the human patient immediately following administration of the tablet, wherein the tablet contains 20 mg of meloxicam, or a molar equivalent amount of a salt of meloxicam, and 10 mg of rizatriptan, or a molar equivalent amount of a salt of rizatriptan.

Some embodiments include a method of treating migraine, comprising: administering a tablet containing 20 mg of meloxicam, or a molar equivalent amount of a salt of meloxicam, and mg of rizatriptan, or a molar equivalent amount of a salt of rizatriptan, to a human patient with a clear diagnosis of migraine at the onset of a migraine attack, wherein if the human patient has no response after the tablet is administered, the diagnosis of migraine is reconsidered, and if the clear diagnosis of migraine is confirmed, the tablet is administered during a subsequent migraine attack.

In some embodiments, the combination of meloxicam and rizatriptan should be used where a clear diagnosis of migraine has been established. In some embodiments, if a patient has no response for the first migraine attack treated with the combination of meloxicam and rizatriptan, the diagnosis of migraine should be reconsidered before the combination of meloxicam and rizatriptan is administered to treat any subsequent attacks.

DETAILED DESCRIPTION

This disclosure relates to a combination of meloxicam (an NSAID) and rizatriptan (a serotonin (5-HT) 1B/1D receptor agonist or triptan) for the acute treatment of migraine with or without aura in adults. For convenience, dosage form comprising a combination of meloxicam and rizatriptan as described herein is referred to as the "subject dosage form." In some embodiments, the subject dosage form (e.g., one tablet) is administered by mouth at the onset of a migraine.

In some embodiments, the maximum daily dose of meloxicam is 20 mg of meloxicam, or a molar equivalent amount of a salt of meloxicam. In some embodiments, the maximum daily dose of rizatriptan is 10 mg of rizatriptan, or a molar equivalent amount of a salt of rizatriptan.

In some embodiments, the maximum daily dose is unit of the dosage form or one tablet, or 20 mg of meloxicam, or a molar equivalent amount of a salt of meloxicam, and 10 mg of rizatriptan, or a molar equivalent amount of a salt of rizatriptan.

In some embodiments, no more than 7 migraines or migraine attacks are treated in a 30-day period.

Meloxicam has the molecular formula $C_{14}H_{13}N_3O_4S_2$ and is chemically designated as 4-hydroxy-2-methyl-N-(5 methyl-2-thiazolyl)-2H-1,2-benzothiazine-3-carboxamide-1,1-dioxide. It has a molecular weight of 351.4 g/mole.

The structural formula is:

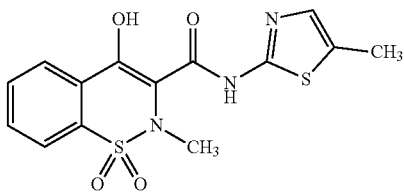 [SMILES: Cc1cnc(NC(=O)C2=C(O)c3ccccc3S(=O)(=O)N2C)s1]

Meloxicam is a pastel yellow solid, practically insoluble in water, with higher solubility observed in strong acids and bases. It is very slightly soluble in methanol. Meloxicam has an apparent partition coefficient (log P)=0.1 in n-octanol/buffer pH 7.4. Meloxicam has pKa values of 1.1 and 4.2.

Rizatriptan benzoate has the molecular formula $C_{15}H_{19}N_5 \cdot C_7H_6O_2$ and is chemically designated as N,N dimethyl-5-(1H-1,2,4-triazol-1-ylmethyl)-1H indole-3 ethanamine monobenzoate. The molecular weight of the free base rizatriptan is 269.4 g/mole. The structural formula is:

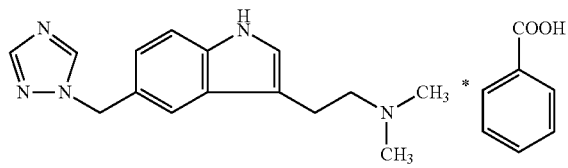 [SMILES: CN(C)CCc1c[nH]c2ccc(Cn3cncn3)cc12 ; O=C(O)c1ccccc1]

Rizatriptan benzoate is a white to off-white, crystalline solid that is soluble in water at about 42 mg per mL (expressed as free base) at 25° C.

Unless otherwise indicated, any reference to a compound herein, such as rizatriptan or meloxicam, by structure, name, or any other means, includes pharmaceutically acceptable salts; alternate solid forms, such as polymorphs, crystals, solvates, hydrates, etc.; tautomers; deuterium-modified compounds, such as deuterium modified dextromethorphan; or any chemical species that may rapidly convert to a compound described herein under conditions in which the compounds are used as described herein.

A dosage form, such as a tablet, may contain, for example, about 18-22 mg, such as 20 mg of meloxicam free base, or a molar equivalent amount of a salt form of meloxicam, and about 9-11 mg, such as about 10 mg of rizatriptan free base, or a molar equivalent amount of a salt form of rizatriptan (e.g., about 14-15 mg, such as about 14.5 mg, of rizatriptan benzoate, or a molar equivalent amount of another salt form of rizatriptan).

A dosage form, such as a tablet, may also contain: colloidal silicon dioxide, crospovidone, magnesium stearate, microcrystalline cellulose, partially hydrolyzed polyvinyl alcohol, polyethylene glycol, povidone, pregelatinized starch, sodium bicarbonate, sulfobutyl-ether-β-cyclodextrin sodium, talc, and/or titanium dioxide.

In some embodiments, the dosage form, such as the tablet, contains colloidal silicon dioxide.

In some embodiments, the dosage form, such as the tablet, contains crospovidone.

In some embodiments, the dosage form, such as the tablet, contains magnesium stearate.

In some embodiments, the dosage form, such as the tablet, contains microcrystalline cellulose.

In some embodiments, the dosage form, such as the tablet, contains partially hydrolyzed polyvinyl alcohol.

In some embodiments, the dosage form, such as the tablet, contains polyethylene glycol.

In some embodiments, the dosage form, such as the tablet, contains povidone.

In some embodiments, the dosage form, such as the tablet, contains pregelatinized starch.

In some embodiments, the dosage form, such as the tablet, contains sodium bicarbonate.

In some embodiments, the dosage form, such as the tablet, contains sulfobutyl-ether-β-cyclodextrin sodium.

In some embodiments, the dosage form, such as the tablet, contains talc.

In some embodiments, the dosage form, such as the tablet, contains titanium dioxide.

In some embodiments, the human patient is screened for a history of asthma, urticaria, or other allergic-type reactions after taking aspirin or other NSAIDs. In some embodiments, the human patient does not have, or is selected for not having a history of asthma, urticaria, or other allergic-type reactions after taking aspirin or other NSAIDs. History of asthma, urticaria, or other allergic-type reactions after taking aspirin or other NSAIDs. Severe, sometimes fatal anaphylactic-like reactions to NSAIDs have been reported in such patients.

In some embodiments, the human patient is screened for history of ischemic heart disease or coronary artery vasospasm. In some embodiments, the human patient does not have, or is selected for not having a history of ischemic heart disease or coronary artery vasospasm.

In some embodiments, the human patient is screened for a history of stroke or transient ischemic attack. In some embodiments, the human patient does not have, or is selected for not having a history of stroke or transient ischemic attack.

In some embodiments, the human patient is screened for a peripheral vascular disease. In some embodiments, the human patient does not have, or is selected for not having a peripheral vascular disease.

In some embodiments, the human patient is screened for an ischemic bowel disease. In some embodiments, the human patient does not have, or is selected for not having a ischemic bowel disease.

In some embodiments, the human patient is screened for uncontrolled hypertension. In some embodiments, the human patient does not have, or is selected for not having a uncontrolled hypertension.

In some embodiments, the human patient is screened for moderate to severe renal insufficiency. In some embodiments, the human patient does not have, or is selected for not having a moderate to severe renal insufficiency.

In some embodiments, the human patient is screened for recent (within 24 hours) use of an ergotamine-containing medication. In some embodiments, the human patient does not have, or is selected for not having a recent (within 24 hours) use of an ergotamine-containing medication.

In some embodiments, the human patient is screened for use of a MAO-A inhibitor in the past 2 weeks. In some embodiments, the human patient does not have, or is selected for not having a used an MAO-A inhibitor in the past 2 weeks.

In some embodiments, the human patient is screened for hemiplegic or basilar migraine. In some embodiments, the human patient does not have, or is selected for not having a hemiplegic or basilar migraine.

In some embodiments, a subject combination is not administered in the setting of CABG surgery.

In some embodiments, if the patient has multiple cardiovascular risk factors, a cardiac evaluation is performed on the patient. For example, the human patient may be evaluated for myocardial ischemia, myocardial infarction, and/or Prinzmetal's angina.

In some embodiments, the human patient is screened for cluster headaches. In some embodiments, the human patient does not have, or is selected for not having cluster headaches.

In some embodiments, the human patient is screened for tension headaches. In some embodiments, the human patient does not have, or is selected for not having tension headaches.

In some embodiments, the human patient is screened for more than eight migraine headaches during either of the past two months. In some embodiments, the human patient does not have, or is selected for not having more than eight migraine headaches during either of the past two months.

In some embodiments, the human patient is screened for chronic daily headaches, or 15 or more non-migraine headache days/month for the past three months. In some embodiments, the human patient does not have, or is selected for not having chronic daily headaches, or 15 or more non-migraine headache days/month for the past three months.

In some embodiments, the human patient is screened for hemiplegic or basilar migraine. In some embodiments, the human patient does not have, or is selected for not having a hemiplegic or basilar migraine.

In some embodiments, the human patient is screened for hemiplegic or basilar migraine. In some embodiments, the human patient does not have, or is selected for not having a hemiplegic or basilar migraine.

In some embodiments the human patient is, or is selected for being, 18 to 65 years of age inclusive.

In some embodiments the human patient has, or is selected for having, an established diagnosis of migraine (history indicating the presence of migraine for at least 1 year) with or without aura as defined by the International Classification of Headache Disorders 3rd edition (ICHD-3) criteria.

In some embodiments the human patient has, or is selected for having, a diagnosis of migraine attacks with or without aura, presenting before age 50.

In some embodiments the human patient has, or is selected for having, had a history, on average, of 2 to 8 migraine attacks per month over the past 3 months.

In some embodiments the human patient has, or is selected for having, at least 1, and no more than 8, migraine attacks in each of the past three months.

In some embodiments the human patient has, or is selected for having had a history of usual migraine duration of >3 hours untreated (by history) for the past 3 months.

In some embodiments the human patient has, or is selected for having, had a body weight≥45 kg and a BMI≤40 $kg/m^2$.

In some embodiments the human patient has not, or is selected for not having, received a selective serotonin reuptake inhibitor (SSRI) or serotonin norepinephrine reuptake inhibitor (SNRI); if the human patient is receiving a selective serotonin reuptake inhibitor (SSRI) or serotonin norepinephrine reuptake inhibitor (SNRI), the dose had been stable for at least 8 weeks prior to treatment.

In some embodiments, if female, the human patient is, or is selected for being, either not of childbearing potential (defined as postmenopausal for at least 1 year or surgically sterile [bilateral tubal ligation, bilateral oophorectomy, or hysterectomy]) or nonlactating and nonpregnant (had negative pregnancy test results at screening and baseline), did not plan to get pregnant during the study or for at least 1 month after, and was using a reliable method of contraception, before study drug administration and for the duration of the study. Reliable methods of contraception included hormonal, double-barrier methods (e.g., condom and diaphragm, condom and foam, condom and sponge, each with spermicidal jellies or cream), intrauterine devices, vasectomized partners (>6 months prior to randomization), and abstinence.

In some embodiments the human patient is, or is selected for being, willing and able to complete a Headache Diary.

In some embodiments, the human patient has not, or is selected for not having, a known history of allergic reaction, hypersensitivity, or clinically significant intolerance to rizatriptan or another triptan, acetaminophen, aspirin, or any NSAIDs, including meloxicam; history of NSAID-induced bronchospasm (participants with the triad of asthma, nasal polyps, and chronic rhinitis were at greater risk for bronchospasm and were to be considered carefully); or hypersensitivity, allergy, or significant reaction to any ingredients of the study drug.

In some embodiments, the human patient has not, or is selected for not having, experienced >8 migraine attacks monthly during either of the past 2 months.

In some embodiments, the human patient was not, or is selected for not suffering from cluster headaches (every day or every other day), or other types of migraine.

In some embodiments, the human patient has not, or is selected for not having experienced chronic daily headache (≥15 days per month of non-migraine headaches during each of the prior 3 months).

In some embodiments, the human patient does not, or is selected for not having a history of brain stem aura, ophthalmoplegic or hemiplegic migraine headache, or any potentially serious neurological condition that was associated with headache.

In some embodiments, the human patient has not, or is selected for not having confirmed or suspected cardiovascular or cerebrovascular disease.

In some embodiments, the human patient has not, or is selected for not having history, symptoms, or significant risk factors for ischemic heart (e.g., silent ischemia, angina, myocardial infarction); coronary artery vasospasm; arrhythmia (e.g., atrial fibrillation or flutter, frequent premature ventricular contractions, atrioventricular block); clinically significant findings on ECG; cardiac accessory conduction pathway disorder (e.g., Wolff-Parkinson-White syndrome); or other cardiovascular disease.

In some embodiments, the human patient has not, or is selected for not having history of stroke, transient ischemic attack, or other cerebrovascular syndrome; peripheral vascular disease; or ischemic bowel disease.

In some embodiments, the human patient has not, or is selected for not having uncontrolled hypertension (diastolic blood pressure >95 mm Hg or systolic blood pressure >160 mm Hg).

In some embodiments, the human patient is female, and has not, or is selected for not having was taking estrogenic contraceptives and, in addition, smoked and had experienced migraine attack with aura.

In some embodiments, the human patient has not, or is selected for not having a concurrent medical condition(s) that required the chronic (daily or near daily) use of analgesics, narcotic analgesics, steroidal or nonsteroidal anti-inflammatory agents, tranquilizers, sedatives, hypnotics, antipsychotics, or nitrates or their use for prevention of migraine attacks.

In some embodiments, the human patient has not, or is selected for not having clinically significant abnormalities indicated from the medical history, physical examination, clinical chemistry, hematology, or urine drug screen.

In some embodiments, the human patient has not, or is selected for not having a diagnosis or suspicion of drug-induced or chronic daily headaches within 1 year.

In some embodiments, the human patient has not, or is selected for not having used monoamine oxidase (MAO) inhibitor, lithium, methylergonovine, or cimetidine in the 2 weeks before randomization.

In some embodiments, the human patient has not, or is selected for not having a history or current diagnosis of any clinically significant cardiac, pulmonary, neurological, immunological, hematological, gastrointestinal (GI), hepatic, renal, or endocrine disease.

In some embodiments, the human patient has not, or is selected for not having a history or current diagnosis of schizophrenia or another significant psychiatric disorder.

In some embodiments, the human patient has not, or is selected for not having receiving systemic chemotherapy, had an active malignancy of any type, or had been diagnosed with cancer within the previous 5 years (excluding squamous or basal cell carcinoma of the skin).

In some embodiments, the human patient has not, or is selected for not having a known or suspected history of alcoholism or drug abuse or misuse within the past 1 year.

In some embodiments, the human patient has not, or is selected for not currently having, or within 1 year, any clinically significant GI disorder, including peptic or gastric ulcers or GI bleeding.

In some embodiments, the human patient has not, or is selected for not having a medical or surgical condition of the GI system (including motility dysfunction) or renal system that might significantly alter the absorption, distribution, or excretion of any drug substance.

In some embodiments, the human patient being treated with the subject dosage form is not treated with concurrent analgesic or NSAID.

In some embodiments, the human patient has not, or is selected for not currently receiving or expecting to use anticoagulants (e.g., heparin, warfarin, nutritional supplements having anticoagulant properties) or having bleeding problems, coagulation abnormalities, active blood dyscrasia, hemorrhagic disease, anemia, *porphyria*, phenylketonuria, bone marrow suppression, or immunosuppression.

In some embodiments, the human patient has not, or is selected for not currently receiving propranolol or had received propranolol within the past 2 weeks.

In some embodiments, the human patient has not, or is selected for not having been treated with agents that could have affected the analgesic response (such as central alpha adrenergic agents [clonidine and tizanidine]) within the past 2 weeks.

A combination of meloxicam and rizatriptan should not be given to patients with ischemic or vasospastic coronary artery disease. There have been rare reports of serious cardiac adverse reactions, including acute myocardial infarction, occurring within a few hours following administration of rizatriptan. Some of these reactions occurred in patients without known coronary artery disease (CAD). 5-HT1 agonists, including a subject combination may cause coronary artery vasospasm (Prinzmetal's Angina), even in patients without a history of CAD.

In some embodiments, triptan-naïve patients who have multiple cardiovascular risk factors (e.g., increased age, diabetes, hypertension, smoking, obesity, strong family history of CAD) have a cardiovascular evaluation prior to receiving a subject combination. In some embodiments, if there is evidence of CAD or coronary artery vasospasm, a subject combination is not administered. In some embodiments, for a human patient who has a negative cardiovascular evaluation, a treatment method comprises administering a first dose of a subject combination in a medically-supervised setting, and performing an electrocardiogram (ECG) on the human patient immediately following administration of a subject combination. In some embodiments, a treatment method may comprise periodic cardiovascular evaluation wherein the human patient is an intermittent long-term users of a subject combination, and the human patient has cardiovascular risk factors.

In some embodiments, the use of a subject combination in patients with a recent myocardial infarction (MI) is avoided unless the benefits are expected to outweigh the risk of recurrent CV thrombotic events. In some embodiments, if a subject combination is used in a human patient with a recent MI, the human patient is monitored for signs of cardiac ischemia.

In some embodiments, the human patient is screened for ischemic coronary artery disease (angina pectoris, history of myocardial infarction, or documented silent ischemia), or other significant underlying cardiovascular disease. In some embodiments, the human patient does not have, or is selected for not having ischemic coronary artery disease (angina pectoris, history of myocardial infarction, or documented silent ischemia), or other significant underlying cardiovascular disease.

In some embodiments, the human patient is screened for coronary artery vasospasm including Prinzmetal's angina. In some embodiments, the human patient does not have, or is selected for not having coronary artery vasospasm including Prinzmetal's angina.

In some embodiments, the human patient is screened for a history of stroke or transient ischemic attack (TIA). In some embodiments, the human patient does not have, or is selected for not having a history of stroke or transient ischemic attack (TIA).

In some embodiments, the human patient is screened for peripheral vascular disease (PVD). In some embodiments, the human patient does not have, or is selected for not having PVD.

In some embodiments, the human patient is screened for ischemic bowel disease. In some embodiments, the human patient does not have, or is selected for not having ischemic bowel disease.

In some embodiments, the human patient is screened for uncontrolled hypertension. In some embodiments, the human patient does not have, or is selected for not having uncontrolled hypertension.

In some embodiments, the human patient is screened for to determine whether they are moderate to severe renal insufficiency patients who are at risk for renal failure due to volume depletion. In some embodiments, the human patient does not have, or is selected for not being moderate to severe renal insufficiency patients who are at risk for renal failure due to volume depletion.

In some embodiments, the human patient is screened for recent use (i.e., within 24 hours) of an ergotamine-containing medication, or ergot-type medication (such as dihydroergotamine or methysergide). In some embodiments, the human patient has not, or is selected for not recently used (i.e., within 24 hours) of an ergotamine-containing medication, or ergot-type medication (such as dihydroergotamine or methysergide)

In some embodiments, the human patient is screened for concurrent administration or recent discontinuation (i.e., within 2 weeks) of a MAO-A inhibitor. In some embodiments, the human patient does not have, or is selected for not having concurrent administration or recent discontinuation (i.e., within 2 weeks) of a MAO-A inhibitor.

In some embodiments, the human patient is screened for hemiplegic or basilar migraine. In some embodiments, the human patient does not have, or is selected for not having In some embodiments, the human patient is monitored for life-threatening disturbances of cardiac rhythm, including ventricular tachycardia and ventricular fibrillation leading to death, and the subject dosage form is discontinued if these disturbances occur.

As with other 5-HT1 agonists, sensations of tightness, pain, pressure, and heaviness in the precordium, throat, neck and jaw commonly occur after treatment with the subject dosage form and are usually non-cardiac in origin. However, in some embodiments, a cardiac origin is suspected, the human patient is evaluated. In some embodiments, the evaluation reveals that the human patient does not have CAD or Prinzmetal's variant angina, and treatment with the subject dosage form is continued.

Cerebral hemorrhage, subarachnoid hemorrhage, and stroke have occurred in patients treated with 5-HT1 agonists, and some have resulted in fatalities. In a number of cases, it appears possible that the cerebrovascular events were primary, the 5-HT1 agonist having been administered in the incorrect belief that the symptoms experienced were a consequence of migraine, when they were not.

In some embodiments, the human patient is monitored for a cerebrovascular event (e.g., stroke, hemorrhage, transient ischemic attack). If no cerebrovascular event (e.g., stroke, hemorrhage, transient ischemic attack) occurs, treatment with a subject dosage form is continued. If a cerebrovascular event occurs, treatment with the subject dosage form is discontinued.

In some embodiments, the human patient has not previously been diagnosed as a migraineur, and the human patient is evaluated to exclude other potentially serious neurological conditions before the subject dosage form is administered as described herein. In some embodiments, the human patient is migraineur who presents with atypical symptoms, and the human patient is evaluated to exclude other potentially serious neurological conditions before the subject dosage form is administered as described herein. In some embodiments, the human patient is evaluated to exclude a history of stroke or transient ischemic attack before the subject dosage form is administered as described herein.

5-HT1 agonists, including the subject dosage form, may cause non-coronary vasospastic reactions, such as peripheral vascular ischemia, gastrointestinal vascular ischemia and infarction (presenting with abdominal pain and bloody diarrhea), splenic infarction, and Raynaud's syndrome. In some embodiments, the human patient has experienced symptoms or signs suggestive of non-coronary vasospasm reaction following the use of a 5-HT1 agonist, and the suspected vasospasm reaction is ruled out before receiving the subject dosage form, or before receiving additional doses of the subject dosage for.

NSAIDs, including meloxicam, can lead to new onset of hypertension or worsening of pre-existing hypertension, either of which may contribute to the increased incidence of CV events. Patients taking angiotensin converting enzyme (ACE) inhibitors, thiazides or loop diuretics may have impaired response to these therapies when taking NSAIDs [see Drug Interactions (7.1)].

Significant elevation in blood pressure (BP), including hypertensive crisis with acute impairment of organ systems, has been reported on rare occasions in patients with and without a history of hypertension receiving 5-HT1 agonists, including rizatriptan. In healthy young adult male and female patients who received maximal doses of rizatriptan (10 mg every 2 hours for 3 doses), slight increases in BP (approximately 2-3 mmHg) were observed. In some embodiments, the human patient is monitored or evaluated for uncontrolled hypertension. In some embodiments, the human patient does not have, or is selected for not having, uncontrolled hypertension.

In some embodiments, the blood pressure of the human patient is monitored during the initiation of the subject dosage form treatment. In some embodiments, the blood pressure of the human patient is monitored throughout the course of therapy. In some embodiments, the blood pressure of the human patient is monitored during the initiation of the subject dosage form treatment and throughout the course of therapy.

In some embodiments, the lowest effective dosage of the subject dosage form is administered the shortest possible duration.

In some embodiments, the subject dosage form is not administered with another NSAID.

In some embodiments, the subject dosage form is administered to the human patient for treatment of migraine, and the human patient and those responsible for the care of the human patient are advised to remain alert for signs and symptoms of GI ulceration and bleeding.

In some embodiments, the human patient is suspected to have a serious GI adverse event, the human patient is evaluated and treated for a serious GI adverse event, and the subject dosage form is not administered again until a serious GI adverse event is ruled out.

In some embodiments, the subject dosage form is administered to a human patient who is concomitantly using aspirin (such as low-dose aspirin) for cardiac prophylaxis, and the human patient is monitored for evidence of GI bleeding.

In some embodiments, the human patient is informed of the warning signs and symptoms of hepatotoxicity (e.g., nausea, fatigue, lethargy, diarrhea, pruritus, jaundice, right upper quadrant tenderness, and "flu-like" symptoms), and treatment is continued only as long as clinical signs and symptoms consistent with liver disease do not develop, and if systemic manifestations do not occur (e.g., eosinophilia, rash, etc.).

In some embodiments, the human patient treated with the subject dosage form has a sign or symptom of anemia, and the hemoglobin or hematocrit of the patient is monitored.

In some embodiments, the human patient has a co-morbid condition such as a coagulation disorder, or is concomitantly using of warfarin, other anticoagulants, antiplatelet agents (e.g., aspirin), SSRIs, an SNRIs, or a combination thereof, and the human patient is monitored for signs of bleeding.

The pharmacological activity of the subject dosage form in reducing inflammation, and possibly fever, may diminish the utility of diagnostic signs in detecting infections.

In some embodiments, the human patient being treated with the subject dosage form is periodically monitored with a complete blood count (CBC) and/or a chemistry profile.

In some embodiments, the human patient being is treated with the subject dosage and concomitant use of anticoagulants (e.g., warfarin), antiplatelet agents (e.g., aspirin), SSRIs, and SNRIs is monitored for signs of bleeding.

In some embodiments, the human patient being treated with the subject dosage form is not receiving concomitant analgesic doses of aspirin.

In some embodiments, the human patient being treated with the subject dosage form is receiving concomitant low-dose aspirin for cardiac prophylaxis, and the human patient is monitored more closely for evidence of GI bleeding.

In some embodiments, the human patient being treated with the subject dosage form, and there is no indication that the human patient is experiencing serotonin syndrome.

In some embodiments, the human patient is concomitantly treated with the subject dosage form and an ACE-inhibitor, an ARB, or a beta blocker, and the human patient's blood pressure is monitored. In some embodiments, the human patient is hydrated. In some embodiments, the renal function of the human patient is assessed at the beginning of the concomitant treatment and periodically thereafter.

In some embodiments, the human patient is concomitantly treated with the subject dosage form an ACE-inhibitors or an ARBs, wherein the human patient is elderly, volume-depleted, or has impaired renal function, and the human patient is monitored for signs of worsening renal function. In some embodiments, the human patient is hydrated. In some embodiments, the renal function of the human patient is assessed at the beginning of the concomitant treatment and periodically thereafter.

In some embodiments, the human patient is concomitantly treated with the subject dosage form and a diuretic, and the human patient is observed for signs of worsening renal function.

In some embodiments, the human patient is concomitantly treated with the subject dosage form and lithium, and the human patient is monitored for signs of lithium toxicity.

In some embodiments, the human patient is concomitantly treated with the subject dosage form and methotrexate, and the human patient is monitored for methotrexate toxicity.

In some embodiments, the human patient is concomitantly treated with the subject dosage form and cyclosporine, and the human patient is monitored for signs of worsening renal function.

In some embodiments, the human patient is treated with the subject dosage form, and the human patient does not receive another NSAID or a salicylate concomitantly.

In some embodiments, the human patient is concomitantly treated with the subject dosage form and pemetrexed, and the human patient has renal impairment and the human patient's creatinine clearance ranges from 45 to 79 mL/min, and the human patient is monitored for myelosuppression, renal and GI toxicity.

Patients taking the subject dosage form should interrupt dosing for at least five days before, the day of, and two days following pemetrexed administration.

In some embodiments, the human patient being treated with the subject dosage form is not undergoing treatment with a CYP2C9 inhibitor.

In some embodiments, the human patient being treated with the subject dosage form is not undergoing treatment with an ergotamine-containing or ergot-type medication (like dihydroergotamine or methysergide). In some embodiments, the subject dosage form is not administered within 24 hours of an ergotamine-containing or ergot-type medication (like dihydroergotamine or methysergide)

In some embodiments, the subject dosage form is not used within 24 hours of another 5HT1 agonist.

In some embodiments, the human patient being treated with the subject dosage form is not undergoing treatment with a concomitant MAO-A or a concomitant non-selective MAO inhibitor.

In some embodiments, wherein the human patient is a geriatric patient (age of 65 years or over) who has other cardiovascular risk factors (e.g., diabetes, hypertension, smoking, obesity, strong family history of coronary artery disease), the human patient has a cardiovascular evaluation prior to receiving the subject dosage form.

In some embodiments, the human patient who is being treated using the subject dosage form does not have severe renal impairment and is not at risk for renal failure due to volume depletion or for patients on hemodialysis.

In some embodiments, the human patient who is being treated using the subject dosage form does not have moderate to severe renal insufficiency and is not at risk for renal failure due to volume depletion.

In some embodiments, the human patient who is being treated using the subject dosage form has mild to moderate renal impairment.

The term "treating" or "treatment" includes the diagnosis, cure, mitigation, treatment, or prevention of disease in man or other animals, or any activity that otherwise affects the structure or any function of the body of man or other animals.

Patients who may benefit from the treatments described herein include pediatric patients, such as patients under about 18 years of age, about 0-5 years of age, about 5-10 years of age, about 10-12 years of age, or about 12-18 years of age; adult patients, such as patients having an age of about 18-65 years, about 18-30 years, about 30-50 years, about 50-65 years; and elderly patients, such as patients 65 years of age and over, about 65-75 years of age, about 75-90 years of age, or over 90 years of age.

In some embodiments, the human patient who is being treated using the subject dosage form has mild to moderate hepatic impairment.

The subject dosage form is a combination of rizatriptan and meloxicam formulated to improve the dissolution and absorption of meloxicam. After oral administration of a single dose of the subject dosage form under fasted conditions, meloxicam and rizatriptan are rapidly absorbed. The median $T_{max}$ for meloxicam given as the subject dosage form is 0.88 hour which is different compared to standard oral meloxicam ($T_{max}$ of 4-5 hours), and the median $T_{max}$ for rizatriptan given as the subject dosage form is 0.75 hour. Meloxicam when given in the subject dosage form has a mean $C_{max}$ of approximately 2,900 ng/ml and a mean $AUC_{0-24}$ of approximately 33,000 ng*hr/mL. Rizatriptan when given in the subject dosage form has a mean $C_{max}$ of 32 ng/ml and a mean $AUC_{0-24}$ of 83 ng*hr/mL.

The exposures of meloxicam and rizatriptan were comparable after administration of the subject dosage form in the fasted and fed states. Administration of the subject dosage form after a high-fat, high-calorie meal decreased the exposures of meloxicam by approximately 7% for $AUC_{0-24}$ and 27% for $C_{max}$ and increased the $AUC_{0-24}$ of rizatriptan by approximately 10% with no significant change in Cmax. Food intake delayed the time to maximal plasma concentration for both meloxicam (from 0.875 hours to 5 hours) and rizatriptan (from 0.75 hours to 1.5 hours). Therapeutic concentrations of meloxicam were achieved within 1.5 hours with co-administration of food.

In some embodiments, the human patient who is being treated using the subject dosage form has mild renal impairment.

In some embodiments, the human patient who is being treated using the subject dosage form does not have moderate to severe renal impairment is not recommended.

In some embodiments, the human patient who is being treated using the subject dosage form does not have moderate to severe renal insufficiency and is not at risk for renal failure due to volume depletion. The following applications are incorporated by reference herein in their entireties: U.S. Provisional Application No. 63/751,707, filed Jan. 30, 2025, and U.S. Provisional Application No. 63/751,735, filed Jan. 30, 2025.

EMBODIMENTS

Monitor renal function in patients with renal or hepatic impairment, heart failure, dehydration, or hypovolemia.

Embodiment 1. A method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient, wherein the human patient is not experiencing hemiplegic migraine.

Embodiment 2. The method of Embodiment 1, wherein the maximum daily dose of meloxicam is 20 mg of meloxicam, or a molar equivalent amount of a salt of meloxicam, and the maximum daily dose of rizatriptan is 10 mg of rizatriptan, or a molar equivalent amount of a salt of rizatriptan.

Embodiment 3. The method of Embodiment 2, wherein no more than 7 migraines are treated in a 30-day period.

Embodiment 4. The method of Embodiment 1, wherein the human patient is not experiencing basilar migraine.

Embodiment 5. The method of Embodiment 1, wherein the tablet further contains sulfobutyl-ether-β-cyclodextrin sodium.

Embodiment 6. The method of Embodiment 5, wherein the tablet further contains sodium bicarbonate.

Embodiment 7. The method of Embodiment 1, wherein the tablet further contains partially hydrolyzed polyvinyl alcohol.

Embodiment 8. The method of Embodiment 1, wherein the human patient does not have an ischemic bowel disease.

Embodiment 9. The method of Embodiment 1, wherein the human patient is screened for an ischemic bowel disease.

Embodiment 10. A method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient, wherein the human patient is not experiencing basilar migraine.

Embodiment 11. The method of Embodiment 10, wherein the maximum daily dose of meloxicam is 20 mg of meloxicam, or a molar equivalent amount of a salt of meloxicam, and the maximum daily dose of rizatriptan is 10 mg of rizatriptan, or a molar equivalent amount of a salt of rizatriptan.

Embodiment 12. The method of Embodiment 11, wherein no more than 7 migraines are treated in a 30-day period.

Embodiment 13. The method of Embodiment 10, wherein the tablet further contains sulfobutyl-ether-β-cyclodextrin sodium.

Embodiment 14. The method of Embodiment 13, wherein the tablet further contains sodium bicarbonate.

Embodiment 15. The method of Embodiment 10, wherein the tablet further contains partially hydrolyzed polyvinyl alcohol.

Embodiment 16. The method of Embodiment 10, wherein the human patient does not have an ischemic bowel disease.

Embodiment 17. The method of Embodiment 10, wherein the human patient is screened for an ischemic bowel disease.

Embodiment 18. A method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a human patient, wherein the human patient is not experiencing cluster headache.

Embodiment 19. The method of Embodiment 18, wherein the maximum daily dose of meloxicam is 20 mg of meloxicam, or a molar equivalent amount of a salt of meloxicam, and the maximum daily dose of rizatriptan is 10 mg of rizatriptan, or a molar equivalent amount of a salt of rizatriptan.

Embodiment 20. The method of Embodiment 19, wherein no more than 7 migraines are treated in a 30-day period.

Embodiment 21. The method of Embodiment 18, wherein the tablet further contains sulfobutyl-ether-β-cyclodextrin sodium.

Embodiment 22. The method of Embodiment 21, wherein the tablet further contains sodium bicarbonate.

Embodiment 23. The method of Embodiment 18, wherein the tablet further contains partially hydrolyzed polyvinyl alcohol.

Embodiment 24. The method of Embodiment 18, wherein the human patient does not have an ischemic bowel disease.

Embodiment 25. The method of Embodiment 18, wherein the human patient is screened for an ischemic bowel disease.

Embodiment 26. A method of treating migraine, comprising: administering a tablet containing 20 mg of meloxicam, or a molar equivalent amount of a salt of meloxicam, and 10 mg of rizatriptan, or a molar equivalent amount of a salt of rizatriptan, to a human patient with a clear diagnosis of migraine, wherein if the human patient has no response after the tablet is administered, the diagnosis of migraine is reconsidered, and if the clear diagnosis of migraine is confirmed, the tablet is administered during a subsequent migraine.

Embodiment 27. The method of Embodiment 26, wherein the maximum daily dose of meloxicam is 20 mg of meloxicam, or a molar equivalent amount of a salt of meloxicam, and the maximum daily dose of rizatriptan is 10 mg of rizatriptan, or a molar equivalent amount of a salt of rizatriptan.

Embodiment 28. The method of Embodiment 27, wherein no more than 7 migraines are treated in a 30-day period.

Embodiment 29. The method of Embodiment 26, wherein the human patient is not experiencing basilar migraine.

Embodiment 30. The method of Embodiment 26, wherein the tablet further contains sulfobutyl-ether-β-cyclodextrin sodium.

Embodiment 31. The method of Embodiment 30, wherein the tablet further contains sodium bicarbonate.

Embodiment 32. The method of Embodiment 26, wherein the tablet further contains partially hydrolyzed polyvinyl alcohol.

Embodiment 33. The method of Embodiment 26, wherein the human patient does not have a peripheral vascular disease.

Embodiment 34. The method of Embodiment 26, wherein the human patient is screened for a peripheral vascular disease.

Embodiment 35. The method of Embodiment 26, wherein the human patient is monitored for a cerebrovascular event; wherein if no cerebrovascular event occurs, the tablet is administered during a subsequent migraine; and wherein if a cerebrovascular event occurs, treatment with the tablet is discontinued.

Embodiment 36. The method of Embodiment 26, wherein the human patient does not have a cerebrovascular event.

Embodiment 37. A method of treating migraine, comprising selecting a human patient who has a negative cardiovascular evaluation, administering a first dose of a tablet in a medically-supervised setting, and performing an electrocardiogram (ECG) on the human patient immediately following administration of the tablet, wherein the tablet contains 20 mg of meloxicam, or a molar equivalent amount of a salt of meloxicam, and 10 mg of rizatriptan, or a molar equivalent amount of a salt of rizatriptan.

Embodiment 38. The method of Embodiment 37, wherein the maximum daily dose of meloxicam is 20 mg of meloxicam, or a molar equivalent amount of a salt of meloxicam, and the maximum daily dose of rizatriptan is 10 mg of rizatriptan, or a molar equivalent amount of a salt of rizatriptan.

Embodiment 39. The method of Embodiment 38, wherein no more than 7 migraines are treated in a 30-day period.

Embodiment 40. The method of Embodiment 37, wherein the human patient is not experiencing basilar migraine.

Embodiment 41. The method of Embodiment 37, wherein the tablet further contains sulfobutyl-ether-β-cyclodextrin sodium.

Embodiment 42. The method of Embodiment 41, wherein the tablet further contains sodium bicarbonate.

Embodiment 43. The method of Embodiment 37, wherein the tablet further contains partially hydrolyzed polyvinyl alcohol.

Embodiment 44. The method of Embodiment 37, wherein the human patient does not have a peripheral vascular disease.

Embodiment 45. The method of Embodiment 37, wherein the human patient is screened for a peripheral vascular disease.

Embodiment 46. The method of Embodiment 37, wherein the human patient is monitored for a cerebrovascular event; wherein if no cerebrovascular event occurs, the tablet is administered during a subsequent migraine; and wherein if a cerebrovascular event occurs, treatment with the tablet is discontinued.

Embodiment 47. The method of Embodiment 37, wherein the human patient does not have a cerebrovascular event.

The invention claimed is:

1. A method of treating migraine, comprising administering a tablet containing 20 mg of meloxicam, or a molar equivalent amount of a salt of meloxicam, and 10 mg of rizatriptan, or a molar equivalent amount of a salt of rizatriptan, to a patient with a clear diagnosis of migraine, wherein the patient has heart failure, and renal function is monitored.

2. The method of claim 1, wherein the maximum daily dose of meloxicam is 20 mg of meloxicam, or a molar equivalent amount of a salt of meloxicam, and the maximum daily dose of rizatriptan is 10 mg of rizatriptan, or a molar equivalent amount of a salt of rizatriptan.

3. The method of claim 2, wherein no more than 7 migraines are treated in a 30-day period.

4. The method of claim 1, wherein the tablet further contains sodium bicarbonate.

5. The method of claim 4, wherein the tablet further contains sulfobutyl-ether-β-cyclodextrin sodium.

6. The method of claim 1, wherein the patient does not have a peripheral vascular disease.

7. The method of claim 1, wherein the patient is screened for a peripheral vascular disease.

8. The method of claim 1, wherein the patient is monitored for a cerebrovascular event.

9. The method of claim 8, wherein no cerebrovascular event occurs and the tablet is administered during a subsequent migraine.

10. The method of claim 8, wherein a cerebrovascular event occurs and treatment with the tablet is discontinued.

11. A method of treating migraine, comprising: administering a tablet containing 20 mg of meloxicam, about 14.5 mg of rizatriptan benzoate, and sodium bicarbonate, to a patient with a clear diagnosis of migraine, wherein the patient has heart failure, and renal function is monitored.

12. The method of claim 11, wherein when the tablet is administered under fasted conditions, the mean $T_{max}$ for meloxicam is 0.88 hours.

13. The method of claim 11, wherein when the tablet is administered under fasted conditions, the mean $T_{max}$ for rizatriptan is 0.75 hours.

14. The method of claim 11, wherein when the tablet is administered under fasted conditions, the mean $C_{max}$ for meloxicam is approximately 2,900 ng/mL.

15. The method of claim 11, wherein when the tablet is administered under fasted conditions, the mean $C_{max}$ for rizatriptan is 32 ng/mL.

16. The method of claim 11, wherein when the tablet is administered under fasted conditions, the mean $AUC_{0-24}$ for meloxicam is approximately 33,000 ng*hr/mL.

17. The method of claim 11, wherein when the tablet is administered under fasted conditions, the mean $AUC_{0-24}$ for rizatriptan is 83 ng*hr/mL.

18. The method of claim 11, wherein the tablet is co-administered with food, and therapeutic concentrations of meloxicam are achieved within 1.5 hours.

19. The method of claim 11, wherein administration of more than one non-steroidal anti-inflammatory drug is avoided.

20. The method of claim 11, wherein the human patient does not concomitantly use propranolol.

21. The method of claim 11, wherein a rescue medication is used 2 hours or more after the tablet is administered.

22. The method of claim 11, wherein a rescue medication is used within 24 hours after the tablet is administered.

23. The method of claim 22, wherein the rescue medication is not an ergot or an opioid.

24. The method of claim 11, wherein when the tablet further comprises sulfobutyl-ether-β-cyclodextrin sodium.

* * * * *